(12) United States Patent
Hanson, Jr.

(10) Patent No.: US 11,967,853 B1
(45) Date of Patent: Apr. 23, 2024

(54) TETHERED RECHARGING OF AUTONOMOUS UNDERWATER VEHICLES

(71) Applicant: The United States of America as represented by the Secretary of the Navy, Newport, RI (US)

(72) Inventor: Jeffrey S Hanson, Jr., South Kingstown, RI (US)

(73) Assignee: The United States of America as represented by the Secretary of the Navy

(*) Notice: Subject to any disclaimer, the term of this patent is extended or adjusted under 35 U.S.C. 154(b) by 615 days.

(21) Appl. No.: 17/232,477

(22) Filed: Apr. 16, 2021

(51) Int. Cl.
  *H02J 7/00* (2006.01)
  *B63G 8/00* (2006.01)
  *B63G 8/08* (2006.01)
  *H02J 7/14* (2006.01)

(52) U.S. Cl.
  CPC .......... *H02J 7/1415* (2013.01); *B63G 8/001* (2013.01); *B63G 8/08* (2013.01); *B63G 2008/004* (2013.01)

(58) Field of Classification Search
  USPC .................................................. 320/109, 137
  See application file for complete search history.

(56) References Cited

U.S. PATENT DOCUMENTS

2006/0054074 A1* 3/2006 Wingett ................. B63G 8/001
                                                                      114/312

* cited by examiner

*Primary Examiner* — Samuel Berhanu
(74) *Attorney, Agent, or Firm* — James M. Kasischke; Michael P. Stanley; Jeffry C. Severson

(57) ABSTRACT

An autonomous underwater vehicle includes a vehicle body controlled by a processor. An anchor joined to a tether is disposed in the vehicle. The vehicle has control surfaces for maneuvering, a propulsion unit, and a turbine. The propulsion unit and turbine generate thrust to propel the vehicle. A power source provides power to the vehicle. The turbine is further joined to a generator. When the processor detects that the power source is below a threshold value, the propulsion unit is stopped, the anchor is deployed, and the control surfaces are operated to move the vehicle in a predetermined trajectory through a fluid stream of the environment restrained by the tether. The fluid stream causes rotation of the turbine and generator to recharge the power source.

18 Claims, 3 Drawing Sheets

TETHERED RECHARGING OF AUTONOMOUS UNDERWATER VEHICLES

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to autonomous underwater vehicles (AUVs) and is further directed to AUVs that recharge their battery using ocean currents.

(2) Description of the Prior Art

Autonomous Underwater Vehicles (AUVs) are well known and used in numerous subsea applications, most notably collecting bathymetric data and ocean bottom imaging by means of sensors carried aboard the AUV. As the name implies, these vehicles operate autonomously without pilots, unlike Remotely Operated Vehicles (ROVs), which typically include a coupled tether management system (TMS), as known in the art. Although AUVs may have an acoustic communication mechanism for communication with a remote platform, essentially a mission plan is loaded into an onboard computer, the vehicle is lowered into the water, and it follows that mission plan to collect, utilize, and share bathymetric, geo-acoustic, and other oceanographic (chemical, biological, geological, and physical) data of interest.

In general, AUVs carry their own onboard power source such as batteries or fuel cells. The onboard power source powers the vehicle's propulsion, as well as onboard processors and instrumentation. For example, an AUV may operate energy demanding mechanical propulsion systems and guidance systems requiring high precision-high accuracy inertial measurement units (IMU), depth sensors, GPS, and altimeters. To minimize the power used for propulsion and maximize battery life, most AUVs are shaped like a torpedo, which minimizes the vehicle's drag in the water.

Once the AUV has been launched, there are limited options for charging the AUV. The most popular system for self-charging involves solar panels mounted on the AUV. Solar panel recharging requires the AUV to stay at the surface of the ocean until the charging is complete. Having to stay at the surface can cause issues for the vehicle, such as drift and theft. Solar AUVs (SAUVs) can use an anchor to avoid drift but that limits the operational area for the SAUV to shallow water and does not eliminate the possibility of theft. Operating time is currently limited by the power resources.

There remains a need for a system that allows the AUV to recharge when deployed while remaining under the surface and not adrift.

SUMMARY OF INVENTION

It is a first object to provide a charging system for an underwater vehicle.

It is a second object that the charging system allow the vehicle to remain underwater in a fixed area while charging.

An autonomous underwater vehicle includes a device made up of a vehicle body including a bow region and a stern region. The vehicle body defines a cavity between the bow region and the stern region, and an anchor is disposed in the cavity. The anchor is attached to the vehicle body. Control surfaces are disposed between the bow region and the stern region and attached external to the vehicle. A turbine is disposed external to the vehicle at the stern region. A propulsion unit is disposed within the vehicle body. The propulsion unit is connected to the turbine. The propulsion unit and turbine generate a thrust force to propel the vehicle through an aquatic environment. A processor within the vehicle body controls the propulsion unit and the control surfaces. A power source in the vehicle body provides power to the processor and the propulsion unit. When the processor detects that a power condition of the power source is below a threshold value, the propulsion unit is stopped, and the anchor is deployed. Movement of the vehicle is constrained by the tether. Interaction between the control surfaces and the environmental fluid flow allow the vehicle to be moved in a predetermined trajectory through the aquatic environment causing the turbine to rotate and recharge the power source.

According to another embodiment, an underwater system includes an autonomous underwater vehicle (AUV). The AUV has a body with a cavity. A deployable anchor is disposed in the cavity. The AUV also has a processor and a power source disposed in the vehicle body. The processor is connected to the power source. A propulsion unit is disposed in the vehicle body and also connected to the power source. A turbine is connected to the propulsion unit. The turbine is external to the vehicle body. Control surfaces are attached to the exterior of the vehicle body. The processor controls operation and navigation of the AUV through an aquatic environment. The propulsion unit generates a thrust force by the turbine to propel the AUV through the aquatic environment. The processor monitors charge status of the power source. Responsive to the processor detecting a power condition of the power source below a threshold value, the processor deploys the anchor and controls the AUV in a predetermined trajectory through a fluid stream of the aquatic environment to recharge the power source.

According to a method of controlling an autonomous underwater vehicle, an autonomous underwater vehicle (AUV) is provided. The AUV includes a processor, a power source, a propulsion unit having a turbine external to the AUV, control surfaces, and a deployable anchor. The propulsion unit generates a thrust force by the turbine to propel the AUV through an aquatic environment. Responsive to the processor detecting a power condition of the power source below a threshold value, the speed of the AUV is reduced. The anchor is deployed. The control surfaces are operated to move the AUV in a predetermined trajectory through an environmental fluid stream wherein the turbine rotates and recharges the power source.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

A Tethered Undersea Kite (TUSK) self-charging AUV is disclosed that can recharge its battery using environmental currents. The TUSK AUV includes anchors, control surfaces, alternators (or other mechanical to electrical energy conversion devices), and control software to allow it to use the cross current motion of environmental currents to generate power that will recharge the battery. Using the cross current motion, the TUSK AUV can travel 2 to 16 times faster than the ocean current and generate electricity at a faster rate than if it were stationary.

Currently, AUV technology focuses on increased battery capacity or increased AUV efficiency to lengthen the assigned mission of the AUV. As presently enabled, all AUVs need to be retrieved after use or need to reduce their functional range in order to return to home. The technology described herein allows the AUV to travel further, do more, and operate without human intervention for much longer.

Figure 1:
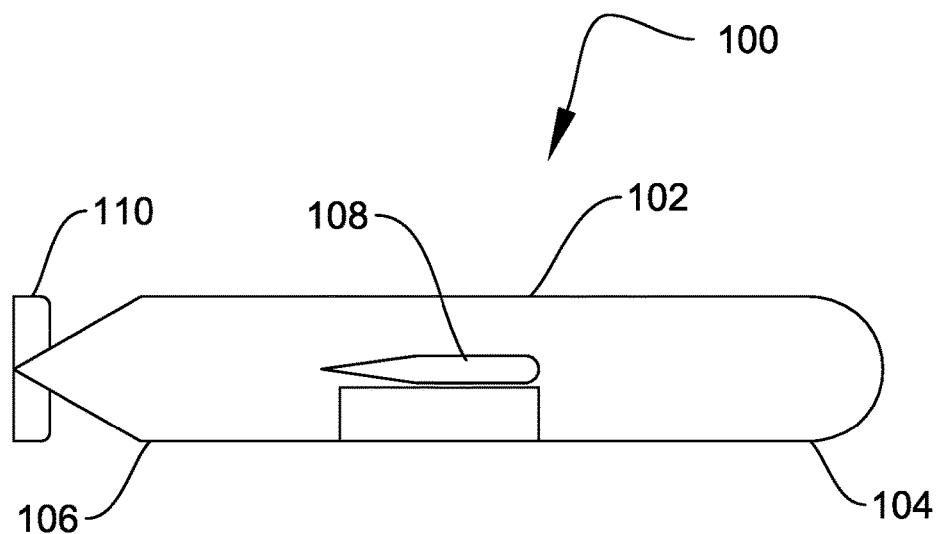
FIG. 1 illustrates an autonomous underwater vehicle (AUV) according to devices and methods herein.

Referring to the drawings, FIG. 1 shows autonomous underwater vehicle (AUV), indicated generally as 100. The AUV 100 is made up of a vehicle body 102 including a bow region 104 and a stern region 106. Control surfaces 108 are disposed between the bow region 104 and the stern region 106 and located on opposite sides, external to the vehicle body 102. The control surfaces 108 may include a rudder, fins, and/or wings that may interact with hydrodynamic flow to direct the movement of the AUV 100. The AUV 100 may be shaped like a torpedo and, depending on the mission and depth rating, its length, girth, and weight can range quite broadly.

Figure 2:
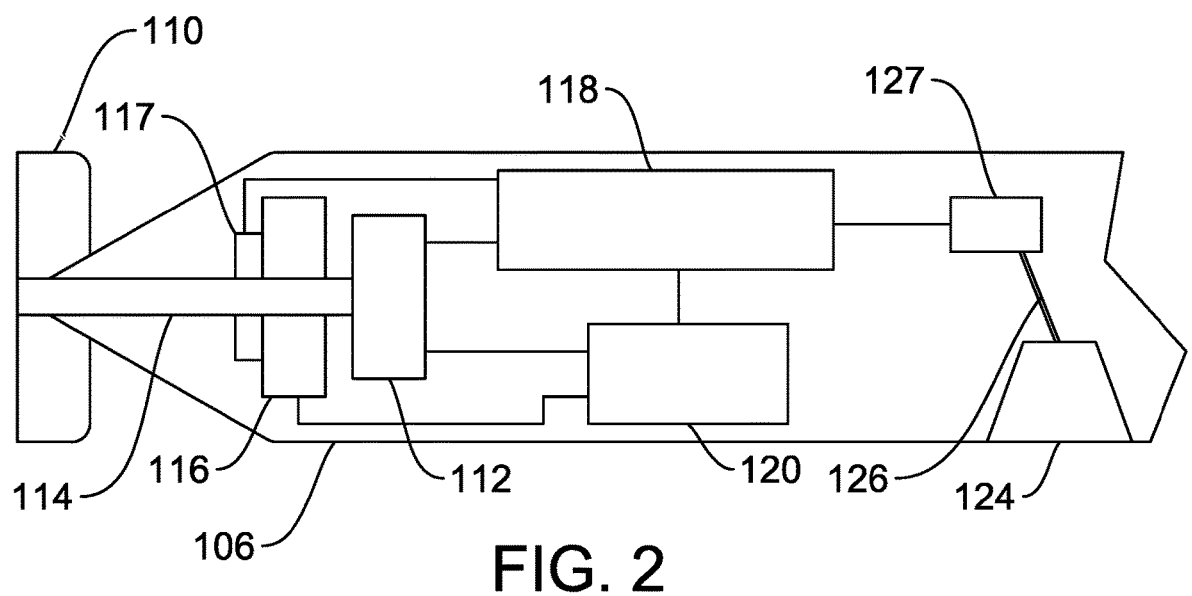
FIG. 2 shows a cut-away diagram of an aft portion of the autonomous underwater vehicle of FIG. 1.

As shown in FIG. 2, a turbine 110 is disposed external to the vehicle body 102 at the stern region 106. The turbine 110 may be any of a variety of propeller type devices or fan-like structures for efficiently moving a body through an aquatic environment. In some embodiments, the turbine may be a variable speed propeller and may be shrouded or unshrouded, as is known in the art. A propulsion unit 112 is disposed within the vehicle body 102. The propulsion unit 112 is connected to the turbine 110 by a shaft 114. In general, the propulsion unit 112 may be an electric motor. The propulsion unit 112 and turbine 110 generate a thrust force to propel the AUV 100 through the environment. As described in further detail below, a charging device, such as an alternator 116, may be operationally attached to the shaft 114. Instead of using a separate propulsion unit 112 and alternator 116, a combined motor/generator unit can be used. Alternator 116 can be mechanically coupled and uncoupled from shaft 114 by a clutch 117 joined to processor 118 so that it is not coupled to shaft 114 when not in use.

A processor 118 is disposed within the vehicle body 102 and controls the propulsion unit 112 and the control surfaces 108. Any of the control surfaces 108 may be controlled independently by the processor 118. In operation, a mission plan may be loaded the processor 118, and the processor 118 operates the control surfaces 108 to direct the movement of the AUV 100 so that the AUV 100 follows that mission plan through the environment, as controlled by the processor 118. That is, the processor 118 uses hydrostatic forces of water moving over the control surfaces 108 to adjust the heading and/or depth of the AUV 100.

A power source 120 is disposed within the vehicle body 102 and provides power to the processor 118, the propulsion unit 112, and instrumentation and controls for the AUV 100. The power source 120 may be a battery, fuel cell, or other rechargeable device having sufficient power and reserve for the duration of the mission plan. Further, in addition to controlling the operation of the AUV 100, the processor 118 keeps track of the position of the AUV 100 and the condition of the power source 120 (i.e., charge level of the battery).

Figure 3:
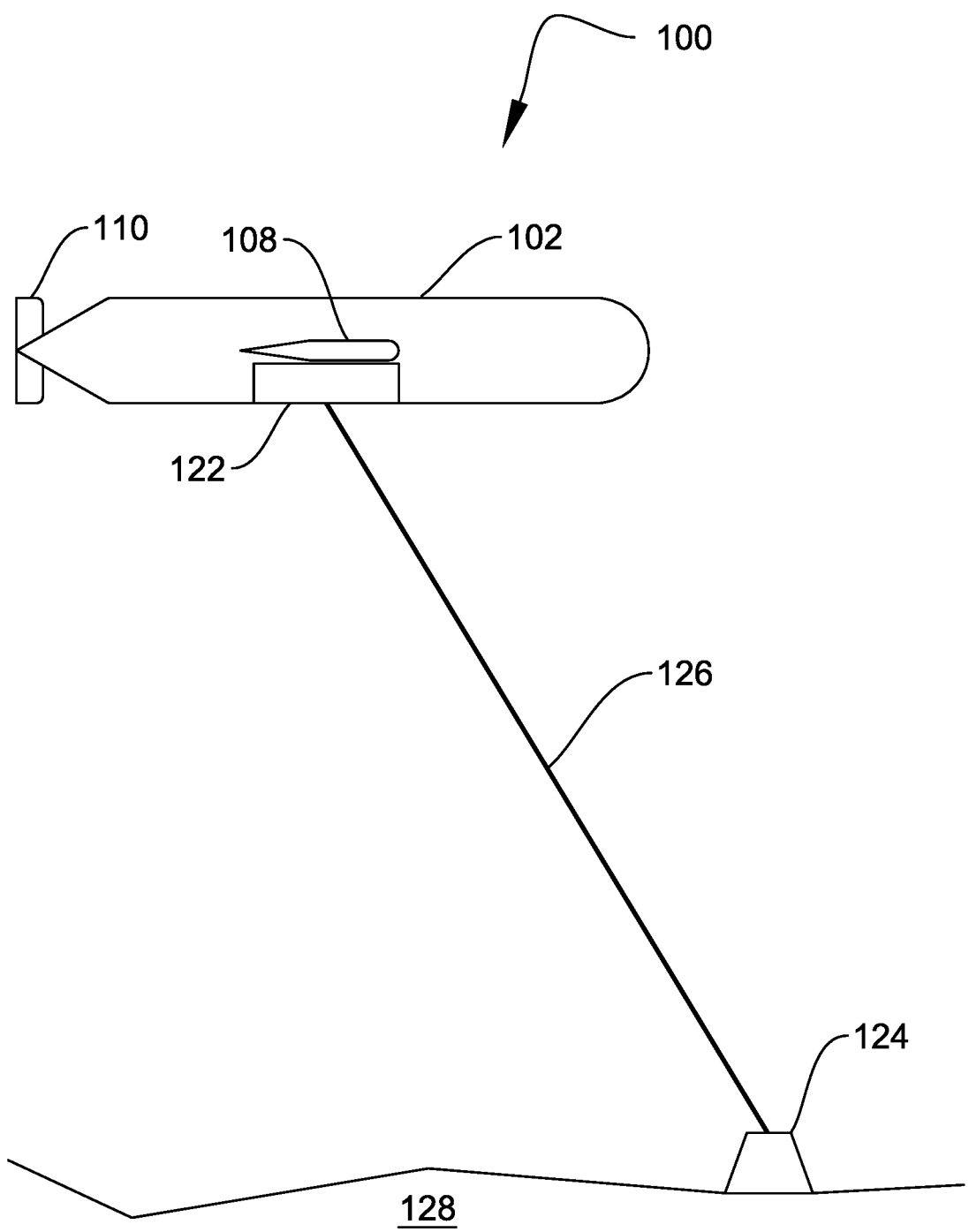
FIG. 3 illustrates an autonomous underwater vehicle at anchor according to devices and methods herein.

Referring to FIG. 3, the vehicle body 102 includes a cavity 122 disposed between the bow region 104 and the stern region 106. An anchor 124 is disposed in the cavity 122. The anchor 124 is attached to the vehicle body 102 by a tether 126. Tether 126 is joined to a deployment and retrieval equipment 127 such as a winch controlled by processor 118.

When the processor 118 determines that the power condition of the power source 120 is below a threshold value, the processor 118 operates the AUV 100 to recharge the power source 120. The threshold value may be a voltage output level or a power output level of the power source 120. It is known to measure a battery's charge state by knowing the battery voltage output and temperature. Processor 118 can compare the known capacity against a voltage curve to estimate the battery charge state. To recharge the power source 120, the processor 118 may stop the propulsion unit 112 and deploy the anchor 124 using the deployment and retrieval equipment 127. The processor 118 can then operate the control surfaces 108 to move the AUV 100 in a predetermined trajectory through a fluid stream of the environment causing the turbine 110 to rotate, which rotates the shaft 114. The alternator 116 rotates with the shaft 114, passing conductors through a magnetic field, and generating alternating current (AC). The AC is then converted to DC to charge the power source 120 (e.g., battery). The operation of alternators is well known in the art and is not described further herein to maintain focus on the salient points.

During a mission, an AUV 100 may be expected to be operated in coastal seas where tidal currents and ocean currents are typically greater than those of the open ocean. For example, an energetic, tidally-driven current in the coastal ocean may have a power density of approximately 200 W/m. According to devices and methods herein, the energy of these currents can be harvested for recharging the AUV 100, whereby the AUV 100 is temporarily tethered to the seafloor 128. The resulting flow of fluid over the vehicle body 102 and through the turbine 110 drives the turbine 110 in reverse, spinning the alternator 116, and generating energy to charge the onboard power source 120. That is, while the AUV 100 travels through the water by motion of the ocean current, fluid flows through the turbine 110, which causes the shaft 114 to rotate. The rotating shaft 114 causes the alternator 116 to generate electricity, which is used to power the power source 120. The AUV 100 may be held above the seafloor 128 using buoyancy or lift from the control surfaces 108.

It has been determined that for a given turbine, greater power generation can be achieved by allowing the vehicle to undergo controlled motion. This leads to an increase in the relative (apparent) water speed over that of freestream speed and, when harnessed, can lead to greater rates of energy extraction when compared with a stationary vehicle.

Figure 4:
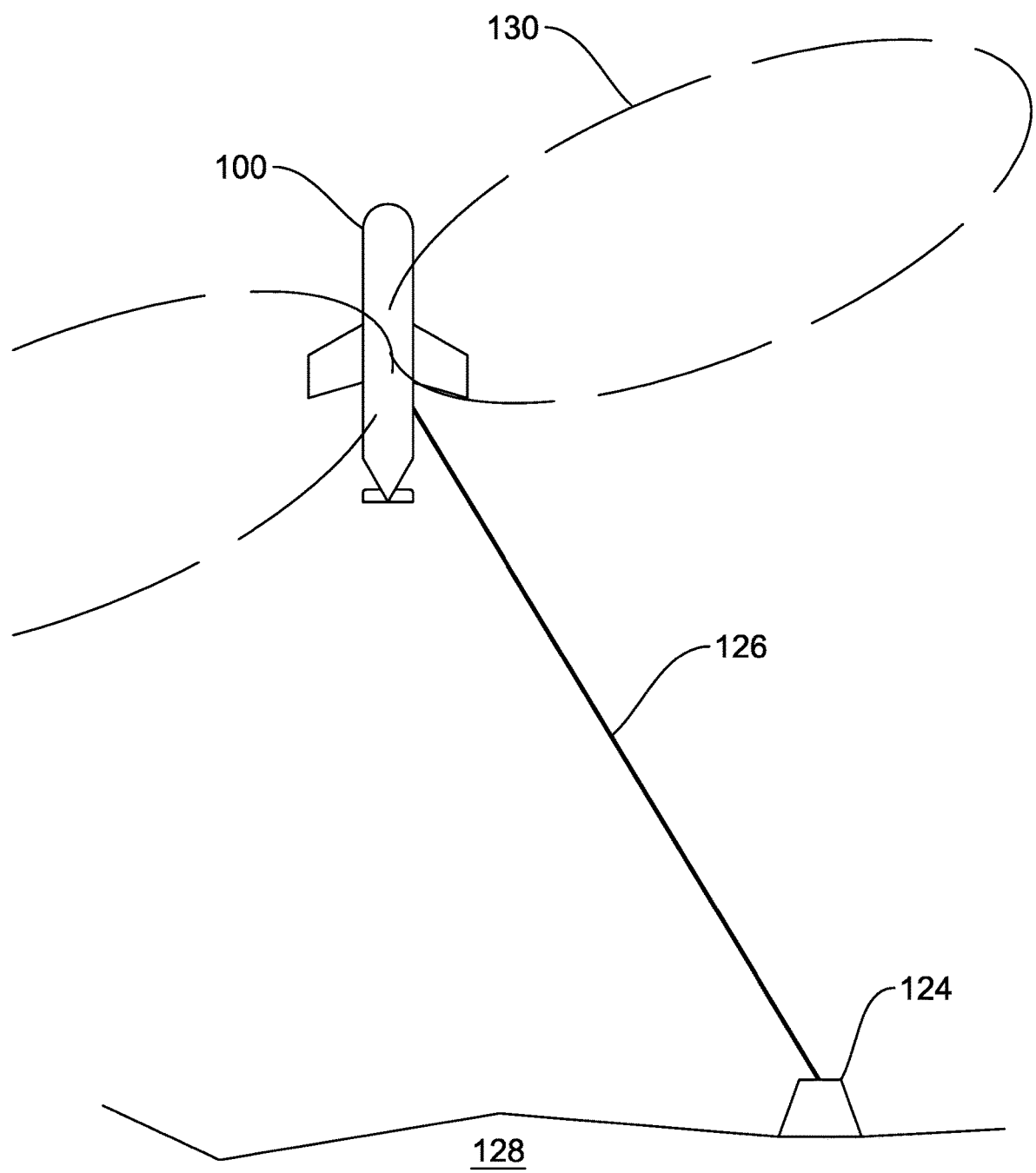
FIG. 4 illustrates a trajectory pattern for recharging an autonomous underwater vehicle according to devices and methods herein.

According to devices and methods herein, a dynamically tethered AUV 100 uses a drag-based approach for self-charging. That is, the power generation is integrated with the AUV 100 in the form of a turbine 110. The AUV 100, which contains a turbine 110, is then operated in a trajectory that maximizes the apparent velocity to optimize power generation by the onboard turbine 110. A common closed trajectory utilized in dynamically tethered kites is the figure eight pattern 130, shown in FIG. 4. In other words, to increase the fluid flow traveling across the turbine 110, the processor 118 operates the control surfaces 108 to perform a predetermined trajectory (e.g., figure eight pattern 130) in the ocean. Academic research suggests that fluid flow can be increased by a factor of approximately 2 to 16 times ocean current speed.

Once the processor 118 determines that the power source 120 has been sufficiently recharged. The processor 118 activates the retrieval equipment 127 to reel in the tether 126 and restore the anchor 124 to cavity 122. In an alternative embodiment, the retrieval equipment 127 can detach the tether 126 from connection between the vehicle body 102 and the anchor 124, abandoning the anchor 124 and tether 126. Upon completion of the charging operation, the AUV 100 can then continue on its programmed mission.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present disclosure, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

What is claimed is:

1. An autonomous underwater vehicle comprising:
 a vehicle body including a bow region and a stern region, said vehicle body having a cavity therein between said bow region and said stern region;
 an anchor disposed in said cavity;
 a tether connecting said anchor to said vehicle body;
 control surfaces disposed on said vehicle body between said bow region and said stern region;
 a turbine disposed on said vehicle body external thereto at said stern region;
 a power source disposed within said vehicle body;
 a propulsion unit disposed within said vehicle body, said propulsion unit being connected to said turbine and said power source for receiving power;
 a processor disposed within said vehicle body and joined to control said propulsion unit and said control surfaces and joined to said power source for monitoring and receiving power; and
 a charging device connected to said turbine, wherein when said processor determines a power condition of said power source below a threshold value, said propulsion unit is stopped, said anchor is deployed, and said control surfaces are controlled to move said vehicle in a predetermined trajectory through environmental fluid allowing rotation of said turbine and causing said charging device to recharge said power source.

2. The apparatus according to claim 1, wherein said propulsion unit and said charging device comprise a combined motor-generator unit.

3. The apparatus according to claim 1, further comprising a shaft connecting said propulsion unit to said turbine.

4. The apparatus according to claim 3, further comprising an alternator connected to said shaft and to said power source, wherein fluid flow through said turbine causes said shaft to rotate, which causes said alternator to generate electricity to recharge said power source.

5. The apparatus according to claim 4, said alternator further comprising a clutch connected to said processor and mechanically joined between said alternator and said shaft to selectably couple said alternator to said shaft.

6. The apparatus according to claim 1, further comprising deployment and retrieval equipment connected to said tether and said processor for deploying and retrieving said anchor.

7. The apparatus according to claim 1, wherein said control surfaces comprise at least one of a rudder, fins, and wings joined to said processor for independent control thereof.

8. A system comprising:
 an autonomous underwater vehicle (AUV) having a vehicle body with a cavity therein, a processor disposed in said vehicle body, a power source disposed in said vehicle body and connected to said processor, a propulsion unit disposed in said vehicle body and connected to said power source and to said processor, a turbine connected to said propulsion unit and positioned on said vehicle body external thereto, an alternator joined to said turbine and to said power source, and control surfaces operatively connected to said processor external to said vehicle body; and
 an anchor disposed in the AUV vehicle body cavity, said anchor being deployable from said vehicle body on command from said processor;
 a tether joined between the AUV vehicle body and said anchor;
 wherein:
 said processor controls operation and navigation of said AUV through an aquatic operating environment;
 said processor monitors charge status of said power source; and
 responsive to said processor determining a power condition of said power source below a threshold value, said processor deploys said anchor and controls said AUV in a predetermined trajectory through the aquatic environment to allow environmental rotation of said turbine, generation of power by said alternator, and recharge of said power source.

9. The system according to claim 8, further comprising a shaft connecting said propulsion unit to said turbine.

10. The system according to claim 9, wherein said AUV alternator further comprises a clutch connected to said processor and to said shaft and alternator to selectively couple said alternator to said shaft.

11. The system according to claim 8, wherein said control surfaces comprise at least one of a rudder, fins, and wings joined to said processor for control of said AUV.

12. The system according to claim 8, further comprising deployment and retrieval equipment connected to said tether and said processor for deploying and retrieving said anchor.

13. A method of controlling an autonomous underwater vehicle, comprising:
   providing an autonomous underwater vehicle (AUV), the AUV having a processor, a power source, a propulsion unit having a turbine external to the AUV, a generator joined to the turbine, control surfaces, and a tether joined to an anchor deployable from the AUV, wherein the propulsion unit operates the turbine to propel the AUV through an aquatic environment;
   monitoring a power condition of the power source with respect to a threshold value;
   reducing the speed of the AUV when the power condition falls below the threshold value;
   deploying the anchor after said step of reducing the speed;
   restraining movement of the AUV by the tether joined between the AUV and the anchor;
   operating the control surfaces to move the AUV in a predetermined trajectory through a fluid stream of the aquatic environment;
   allowing the turbine to spin in response to the fluid stream; and
   generating power in the generator to recharge the power source.

14. The method according to claim 13, wherein the generator is an alternator joined to the turbine by a shaft, the shaft being joined to the propulsion unit.

15. The method according to claim 14, wherein the alternator further comprises a clutch connected to the processor, said method further comprising the step of coupling the alternator to the shaft after the step of deploying the anchor.

16. The method according to claim 13, wherein the power source comprises a battery and the propulsion unit comprises an electric motor.

17. The method according to claim 13, wherein the AUV further comprises deployment and retrieval equipment connected to the tether and the processor wherein said step of deploying the anchor comprises paying out the tether.

18. The method according to claim 13, further comprising:
   monitoring the power condition of the power source being recharged above a threshold value;
   recovering the anchor; and
   operating the propulsion unit and control surfaces to continue AUV operation.

* * * * *